United States Patent [19]

Prinsze

[11] 4,092,580
[45] May 30, 1978

[54] ENERGIZER APPARATUS FOR RECHARGEABLE FLASHLIGHT BATTERIES

[76] Inventor: Onno M. Prinsze, 4528 N. Pima Rd., Scottsdale, Ariz. 85251

[21] Appl. No.: 726,770

[22] Filed: Sep. 27, 1976

Related U.S. Application Data

[63] Continuation-in-part of Ser. No. 557,816, Mar. 12, 1975, abandoned, which is a continuation-in-part of Ser. No. 466,710, May 3, 1974, abandoned.

[51] Int. Cl.² ............................ H02J 7/00; F21L 1/00
[52] U.S. Cl. .......................................... 320/2; 320/22; 320/51; 362/183
[58] Field of Search ........................................ 320/2–4, 320/22–24, 51; 240/10.6 CH

[56] References Cited

U.S. PATENT DOCUMENTS

| 3,217,227 | 11/1965 | Sherwood | 320/51 |
| 3,264,545 | 8/1966 | Kott | 320/2 X |
| 3,539,898 | 11/1968 | Tolmie | 320/22 |
| 3,829,676 | 8/1974 | Nelson et al. | 240/10.6 CH |

Primary Examiner—Robert J. Hickey
Attorney, Agent, or Firm—H. Gordon Shields

[57] ABSTRACT

Energizer apparatus is disclosed for recharging flashlight batteries maintained within the flashlight utilizing the flashlight bulb as a control element and a special adapter cap for the flashlight casing which is substituted for the standard rear end cap of a conventional flashlight to enable the flashlight batteries to be charged in place within the flashlight.

24 Claims, 15 Drawing Figures

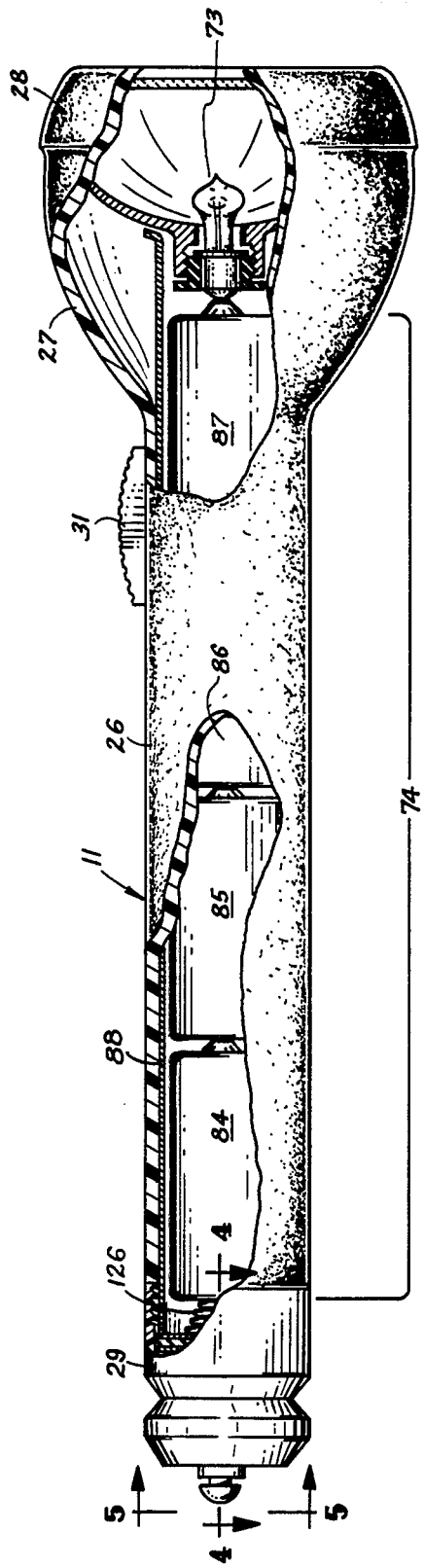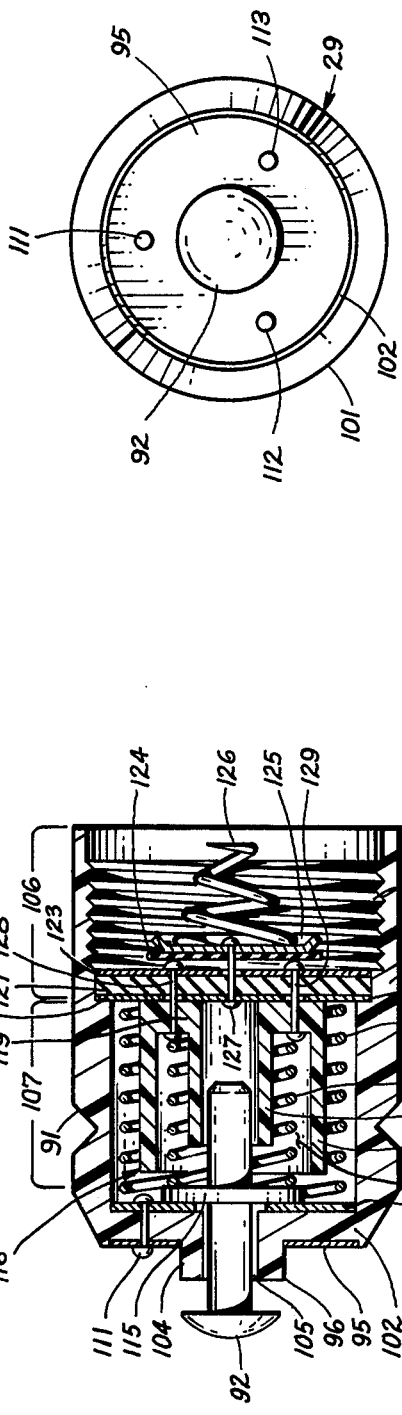

ENERGIZER APPARATUS FOR RECHARGEABLE FLASHLIGHT BATTERIES

CROSS REFERENCE TO RELATED APPLICATIONS

This application is a continuation-in-part of application Ser. No. 557,816, filed Mar. 12, 1975, now abandoned, which was a continuation-in-part of application Ser. No. 466,710, filed May 3, 1974, now also abandoned.

BACKGROUND OF THE INVENTION

1. Field of the Invention

This invention relates to energizer apparatus for recharging batteries, and, more particularly, to energizer apparatus for recharging flashlight batteries in place within a flashlight.

2. Description of the Prior Art

Small battery powered appliances have been in use for some time, but they have in general utilized non-rechargeable batteries, also sometimes identified or referred to as primary batteries, of the type commonly employed in flashlights. In such cases, the batteries are simply replaced when they have run down. For want of a better product, the expense and inconveniences associated with the replacement of the batteries was tolerated.

The necessity for the periodic replacement of such batteries, however, is more than an economic disadvantage. A more serious disadvantage is the possibility that the appliance when most urgently needed is without battery power. Furthermore, because of the limited shelf-life of such batteries, it is difficult to maintain a stock of reliable spares.

Probably the most commonly employed appliance in this category is the flashlight and because the flashlight is so often employed in emergencies involving personal safety, the limitations of non-rechargeable batteries constitute a serious hazard as well as a nuisance.

The recent availability of rechargeable, also sometimes identified or referred to as secondary batteries, batteries appropriate for flashlights and other small appliances has produced a surge of interest in recharging means for these batteries.

U.S. Pat. No. 2,410,527 describes a battery charger which uses the battery of an automobile as the charging energy source. The charger itself is fabricated in a form suitable for mounting on the instrument panel of an automobile and it utilizes an incandescent lamp as a series element for the limitation of charging current. Batteries are removed from the flashlight and placed in the charger to be recharged.

U.S. Pat. No. 3,021,466 describes a flashlight with a built-in charger designed to be plugged into an alternating current (ac) source outlet for recharging. The recharging circuit in this case is simply connected across the battery incorporating appropriate rectifying and current limiting elements but neglecting the use of an isolation transformer as a safety measure.

U.S. Pat. No. 3,217,224 describes a device for the recharging of flashlight batteries without removing the batteries from the flashlight. The flashlight is specially designed to permit external access to the battery terminals. An external incandescent lamp is again employed as a current limiting element.

U.S. Pat. No. 3,829,676 describes a rechargeable flashlight and a charger for the flashlight. The end cap of the flashlight includes an aperture extending through the bottom wall and a metal plate within the end cap biased against the end cap and covering the aperture. The charger receives the end cap of the flashlight and includes an upwardly projecting plug which extends through the aperture and against the metal plate. The flashlight is biased in the charger by the camming action of the front of the flashlight against a sloping wall on the front of the charger. The camming action thus insures that the plug will extend into the end cap.

The arrangement of the apparatus of patent 3,829,676 is vulnerable to potential problems in at least two respects. First, the upwardly projecting plug in the charger may be accidentally bumped or knocked out of alignment, which would prevent its extending through the aperture in the end wall. Second, dirt, rain water, or other foreign matter may enter the aperture and prevent electrical contact between the contact plate and the metal end cap, thus preventing the flashlight from operating as a flashlight due to an open circuit. If such dirt, rain water, or other foreign matter enters the end cap through the aperture, the end cap must be removed from the flashlight and disassembled in order to remove the material and clean the end cap.

More recently, certain small battery powered appliances have been designed for recharging from an ac source utilizing a charger socket which magnetically couples energy into the appliance. Such means are not, however, practical for use in an automobile where only direct current (dc) power is available.

While the prior art device notably advance the state of the art, certain important features are still lacking. As U.S. Pat. No. 3,217,224 points out, there is a need for providing a high degree of user convenience which will assure that the batteries are regularly recharged. This implies that provision be made for the recharging of the batteries without removal from the flashlight. Furthermore, the recharging unit should be carefully designed mechanically to facilitate the removal of the flashlight from the charger. The appearance of the device must be suitable to permit its installation in exposed locations where the charger can serve as a storage means for the flashlight. Finally, the charger should preferably be adapted to ac or dc power sources so that it may utilize either the utility outlet in the home or the battery of an automobile depending upon the intended use of the flashlight. An additional desirable feature not suggested in the prior art is a means for adapting an existing flashlight or related device to charger use.

SUMMARY OF THE INVENTION

The invention described and claimed herein comprises battery charger apparatus for recharging batteries in a flashlight from either, or alternatively both, an alternating current source, such as an ordinary household outlet, or a direct current source, such as an automotive electrical system. The apparatus may be used with either plastic (non metal) flashlights or metal flashlights, and appropriate end caps for the flashlights are disclosed.

It is one object of this invention to provide new and useful improved battery charger apparatus for flashlight batteries.

Another object of this invention is to provide a new and useful improved battery charger apparatus which permits the recharging of flashlight batteries without removing the batteries from the flashlight.

A further object of this invention is to provide such improved battery charger apparatus which is adaptable to utilize either standard ac utility outlet or an automobile battery as a power source.

A still further object of this invention is to provide such improved battery charger apparatus which is aesthetically pleasing and which facilitates the quick and effortless installation and removal of the flashlight from the charger before and after charging, without the need for connecting or disconnecting wires or cables from the flashlight.

A still further object of this invention is to provide an improved battery charger incorporating an adapter cap which may be substituted for the standard end cap to convert existing flashlight models for use with the charger apparatus.

A still further object of this invention is to provide an improved battery charger apparatus which utilizes existing elements of the flashlight, notably the bulb, along with a minimum of additional external parts as multi-functional elements of a charger circuit thereby achieving in the design a high degree of economy, reliability, and low manufacturing cost.

A still further object of the invention is to provide an improved battery charger which protects the user from electrical shock.

Further objects and advantages of the invention will become apparent as the description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 3 is a perspective view, partially cut away, of a flashlight similar to the one shown in FIG. 1.

FIG. 4 is a cross-sectional view of the adapter end cap of the flashlight with a plastic body shown in FIGS. 1 and 3, taken generally along line 4—4 of FIG. 3.

FIG. 5 is an end view of the flashlight shown in FIGS. 1 and 3 taken generally along line 5—5 of FIG. 3.

DESCRIPTION OF THE PREFERRED EMBODIMENT

Figure 1:
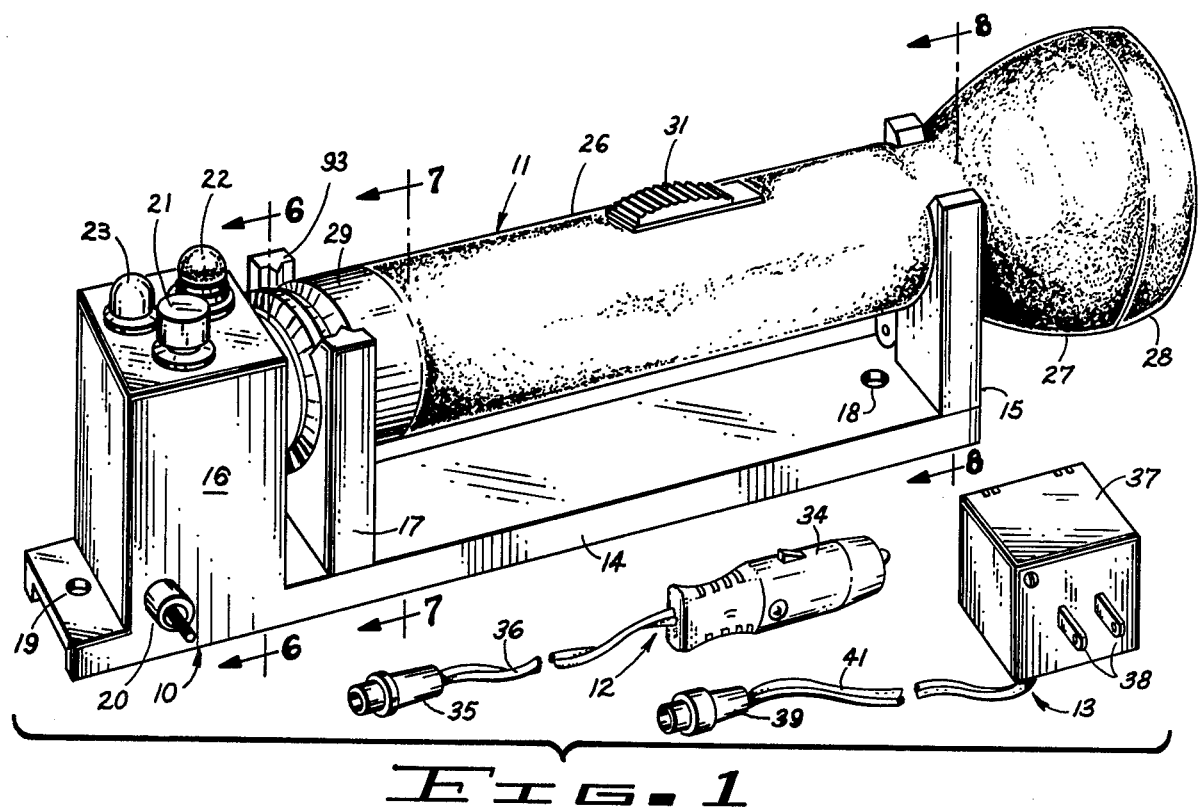
FIG. 1 is a perspective view of battery charger apparatus, including a flashlight installed for charging its batteries.

Referring more particularly to the drawing by characters of reference, FIG. 1 illustrates improved battery charger apparatus 10 with a flashlight 11 installed therein and including accessories such as an automobile adapter 12, which adapts charger 10 for use with a direct current automobile battery as a power source of charging current, and an ac (alternating current) adapter 13, which adapts the charger 10 for connection to ac power sources, such as a standard 110–120 volt, 50 or 60 Hz utility electrical outlet.

The visible parts of charger 10, as shown in FIG. 1, comprise an elongated base 14, a first or forward mounting clamp 15, located at one end, the front end, of base 14, a housing 16 located at the other, or rear, end of base 14, and a second or rear mounting clamp 17, located between housing 16 and mounting clamp 15 but disposed adjacent the housing.

Base 14 has mounting holes 18 and 19 at opposite ends thereof for securing the charger to a supporting surface.

Protruding from the side of housing 16 is a male connector plug 20. Extending from the top surface of the housing is a switch 21, illustrated as a push-button type switch, which sets the "Full-Charge" or the "Stand-By" operating mode of charger 10. A "Full-Charge" indicator lamp 22 and a "Stand-By" indicator lamp 23 are also located on the top of the housing.

The flashlight 11 shown in FIG. 1 comprises a rather long, cylindrical shaped housing 26 having a reflector shell and lens section 27 and lens cap 28 at the front end and an adapter cap 29 at the other or rear end. A light switch 31 is arranged along the outer periphery of the housing between its ends. The housing and the adapter may be made or fabricated out of any appropriate material, such as a metal or a plastic.

Auto adapter 12 comprises a plug 34, which is designed to be plugged into the cigarette lighter receptacle of an automobile, a female receptacle 35, which mates with male plug 20, which extends outwardly from the housing 16 of charger 10, and a two-wire electrical cable 36 joining plug 34 and receptacle 35. With receptacle 35 attached to plug 20 and with plug 34 installed in the cigarette lighter receptacle of an automobile, the battery voltage of the automobile is brought into housing 16 of charger 10 via adapter 12. The cigarette lighter plug connection to the automobile electrical system is shown because of its simplicity. Direct wiring into the automobile system is preferable for permanent installations. Only a single wire may be used if the base 14 of the charger holder is electrically connected to the grounded side of the automobile electrical system.

Ac adapter 13 comprises a transformer and rectifier box 37 having protruding spade terminals or lugs 38 designed to be plugged into a standard 110–120 volt, 50 or 60 Hz utility electrical outlet, in homes, offices, and the like. The adapter includes a female receptacle 39 which mates with male plug 20 of the housing 16 of charger 10, and a two-wire electrical cable 41 joining box 37 and receptacle 39. When lugs 38 of box 37 are plugged into a utility outlet and receptacle 39 is connected to plug 20, the ac voltage from the utility outlet is transformed through a well known voltage step-down isolation transformer within box 37 with the stepped-down voltage rectified and the rectified voltage delivered as a low-voltage directcurrent supply to charger housing 16 via cable 41, receptacle 39 and plug 20.

Figure 2:
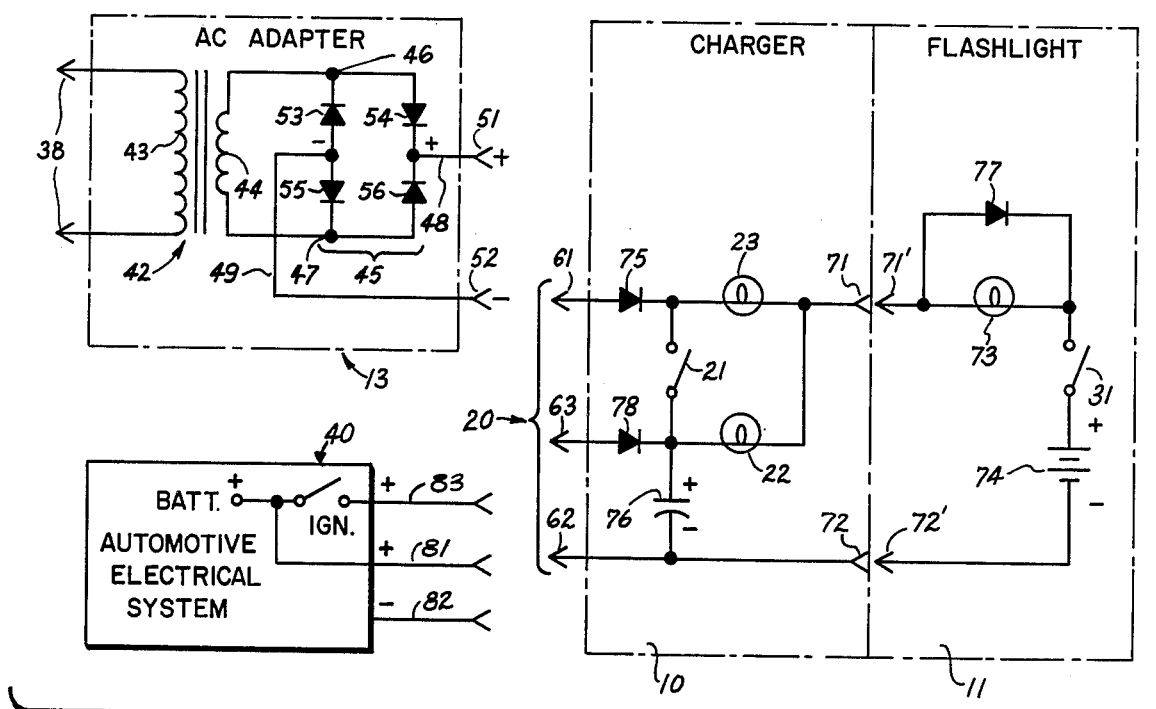
FIG. 2 is a schematic representation of the electrical circuits employed in the battery charger apparatus including an ac adapter, and the flashlight batteries being charged.

FIG. 2 illustrates the internal electrical circuits of adapter 13, charger 10 and flashlight 11, and indicates upper termination of winding 44. It is thus seen that for either instantaneous polarity of winding 44, external current flow is from terminal 51 through the external load to terminal 52 so that terminal 51 is always positive relative to terminal 52. It should be recognized that other forms of a rectifying means may also be used.

When an ac source is connected at connector lugs 38 to serve as the charging energy source, output terminals 51 and 52 are connected by means of the two conductor cable 41, receptacle 39 and plug 20 (see FIG. 1) to input terminals 61 and 62 of charger 10. The input terminals 61 and 62 are connected to, or comprise part of, plug 20. By a means incorporated in the design of adapter cap 29 (see FIG. 1), to be described later, the output terminals 71 and 72 of charger 10 are connected in series with lamp 73, light switch 31, and battery (batteries) 74 of flashlight 11.

The electrical components comprising the circuit of charger 10 include a blocking diode 75, filter capacitor 76 and the externally visible components already mentioned in connection with FIG. 1, i.e., switch 21 and appropriate indicator lamps 22 and 23 of the same or different current ratings.

Diode 75 is incorporated to prevent discharge of the flashlight battery 74 when charger 10 is connected to an automotive electrical system. In some such systems, if the charger is wired into the automobile electrical system and the ignition switch is turned off, some of the automobile accessories will remain connected and will cause the flashlight battery (batteries) to be discharged through the automobile accessories except for the presence of diode 75 which blocks discharge current from battery 74. A second benefit of diode 75 is that it blocks voltages of the wrong polarity accidentally applied at terminals 61 and 62 of the charger and prevents damage to capacitor 76 of the charger and battery 74 of the flashlight. A third benefit of diode 75 is that in installations where half wave rectification is deemed sufficient, this blocking diode in the charger will function as a half wave rectifier. Thus, the rectifier 45 in the adapter 13 may be eliminated. However, half wave rectification will lengthen charging time.

Capacitor 76 is a novel enhancement of the charger circuit which overcomes a problem associated with the use of adapter 13. When a transformer-rectifier source is employed, the impedance of the transformer is ordinarily quite high relative to the impedance of an automobile battery. As a result, the voltage available under high charging conditions is normally much lower than under low charge or standby conditions. This is especially undesirable since ideally it is appropriate to have a lower voltage rather than a higher voltage during standby. It will be noted by an examination of FIG. 2 that capacitor 76 is connected directly across the dc terminals 48 and 49 of bridge rectifier 45 during the "Full-Charge" condition when switch 21 of the charger is closed. This connection of capacitor 76 is known as a capacitor-input filter which raises the dc voltage toward the peak value of the rectified ac voltage. Accordingly, the available voltage for "Full-Charge" is considerably higher than in the "Stand-By" condition for which switch 21 is open. In the "Stand-By" condition, capacitor 76 is no longer effective in raising the dc voltage and the available voltage more closely approximates only the average value of the rectified ac voltage.

Because capacitor 76 always remains charged, there is no arcing to damage the contacts of switch 21 resulting from the incorporation of capacitor 76. This is another benefit arising from the novel circuit configuration involving lamps 22 and 23, switch 21, and capacitor 76.

Lamps 22 and 23 serve simultaneously as indicators, as current-limiting elements, and as protective fuses.

For the "Full-Charge" mode of operation, switch 21 is closed so that lamps 22 and 23 are connected in parallel to provide a low combined resistance to the flow of charging current. This charging current flows from input terminal 61 through lamp 23 and through the parallel connected switch 21 and lamp 22 and through flashlight lamp 73, flashlight switch 31 and battery (batteries) 74 of flashlight 11 to input terminal 62. In this mode of charging, both indicator lamps glow in accordance with their current rating. All three lamps 22, 23, and 73 also seve as protective fuses in the event an excessively high voltage is applied at input terminals 61 and 62. Damage to the charger or to the flashlight is thus prevented by virtue of the fusing function of the lamps.

For the "Stand-By" mode of operation, switch 21 is open so that "Full-Charge" lamp 22 is no longer connected in parallel with lamp 23. Charging current now flows from terminal 61 through diode 75, lamp 23, flashlight lamp 73, switch 31 and battery (batteries) 74 to terminal 62. "Stand-By" lamp 23 is thus illuminated while lamp 23 is not. The relatively high resistance of lamp 23 limits charging current to allow value which is sufficient only to offset the leakage current of battery 74 during long periods of disuse when flashlight 11 is mounted on charger 10 in a standby or storage condition.

If neither lamp 22 nor lamp 23 is lighted when flashlight 11 is mounted in charger 10, it is an indication that the operator has probably failed to close flashlight switch 31 or to properly connect the charger 10 or accessories 12 or 13. Note that for charging, the flashlight switch 31 must be "on", in the closed position.

When the battery of an automobile is to be utilized as the power source, adapter 12 (see FIG. 1) is utilized to connect positive and negative terminals of conductors or connectors 81 and 82, respectively, of an automotive electrical system 40, nominally 12 volts dc, to input terminals 61 and 62, through plug 20, of charger 10. Operation of charger 10 and the charging of battery 74 of flashlight 11 is identical to that described in conjunction with adapter 13 except in this case the filter capacitor 76 serves no useful function.

In the usual case the automobile electrical system voltage is 12 to 14.5 volts which corresponds closely to the rectified value of voltage of the 8.5 to 10 volt transformer winding with the capacitive input filtering provided by capacitor 76. The charger may readily be adapted to be used with other dc voltages as, for example, with a 6 volt or a 24 volt automotive battery by appropriately selecting different wattage ratings for lamps 22 and 23.

In automobile installations, automatic change from Full-Charge with engine on to Stand-By with engine off can be obtained by adding additional circuitry as shown in FIG. 2. A conductor 83 is connected to the battery in the automotive electrical circuitry through the ignition switch. The conductor 81 is connected to the circuitry between the automobile battery and the ignition switch. With this feature, switch 21 and capacitor 76 are eliminated. Instead, a diode 78 is inserted between a terminal 63 and the lamp 22. In this embodiment, conductor 83 is a positive connection to be used with terminal 63 of the charger 10. The flashlight switch still permits the interruption of either charging mode at any time. By connecting charger terminal 61 to the automotive electrical system terminal of conductor 83 rather than 81, the charger is automatically turned off when the automobile ignition switch is opened.

In the case of some fast charge flashlights designed specifically for use with charger 10, it is required to bypass flashlight bulb or lamp 73 during charging in order to raise the available charging current above the rating for the flashlight bulb. The bypassing of the bulb or lamp 73 is accomplished as shown in FIG. 2 by adding diode 77 in parallel with lamp 73, the diode 77 being polarized as shown to pass current only in the charging direction. Fusing action is now accomplished by lamps 22 and 23.

Similarly, the charger 10 may be adapted to charge flashlights having a different type or number of cells and hence a different battery voltage or perhaps a different recommended value of charging current. Again, it is only required to select appropriate ratings for lamps 22 and 23.

Flashlight 11 of FIG. 1, for example, is available in more than one model and may have from one to five batteries or cells. FIG. 3 shows flashlight 11 in a four-battery version. In other respects, flashlight 11 of FIG. 3 is the same as flashlight 11 of FIG. 1. It has a long cylindrical type housing 26, a reflector cell and lens section 27, a lens cap 28 at one end, an adapter cap 29 at its other end, and a light switch 31. Also included are batteries 84, 85, 86 and 87 within the flashlight.

The details of the construction of flashlight 11, except for the end cap, are not the primary concern of this invention except as they relate to the operation of charger 10. The construction of the flashlight, including the internal circuitry and the switch 31, are well known in the art. However, details of flashlight 11 and FIG. 3 will be discussed in conjunction with adapter cap 29 shown in detail in FIG. 4. Adapter cap 29 is designed to replace the standard rear end cap used with most flashlights of plastic or nonconductive construction and to thereby adapt the flashlight for use with charger 10.

A configuration of the end cap is shown in FIG. 4. The end cap 29 includes a wedge shaped annular groove 91 located near the rear of cap 29 and a spring biased switch 92 protruding from a rear flat surface of boss 96 on cap 29. When flashlight 11 is not installed in charger 10, switch 92 is fully extended. In this condition, switch 92 is closed making a direct connection across the terminal 71' and 72', shown in FIG. 2. The electrical circuit of flashlight 11 is accordingly closed, allowing current to flow from the positive terminal of battery 74 (comprising batteries 84, 85, 86, and 87 of FIG. 3) through switch 31, lamp 73, and closed switch 92 of the end cap to the negative terminal of battery 74. The switch 92 is closed through inner disc 114 and retaining clip 115, and respectively through outer coil spring 132, rear conductive surface 122, rivet 127, and circular disc 125 to coil spring 126 which bears against the rear (negative) terminal of battery 84 (see FIG. 3) and through inner coil spring 131, rivets 128 and 129, and forward conductive surface 123 to a conductor 88 (see FIG. 3) which extends into the end cap from the flashlight switch 31. Such conductor, well known in the art, is usually a conductive strip of metal extending from the switch to the rear end of a flashlight where it forms a conductive path from the negative terminal of a battery to the switch. In a metal flashlight, such conductor may be eliminated. An end cap for a metal flashlight is disclosed in FIG. 13 and discussed in detail below.

Figure 6:
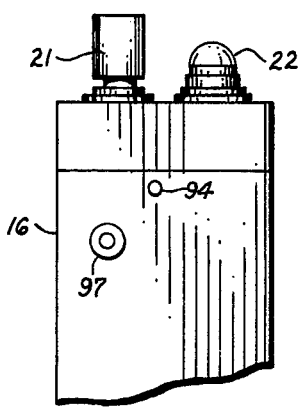
FIG. 6 is an end view of the charger circuit housing of the battery charger shown in FIG. 1, taken generally along line 6—6 of FIG. 1.
Figure 7:
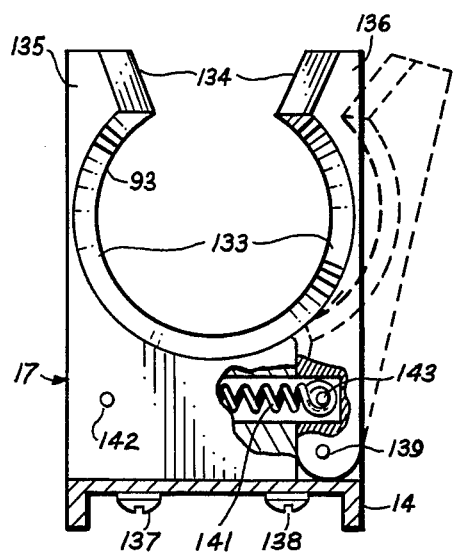
FIG. 7 is an end view of the rear mounting clamp associated with the battery charger of FIG. 1, taken generally along the line 7—7 of FIG. 1.

When flashlight 11 is mounted in charger 10, groove 91 of cap 29 is gripped by a wedge-shaped ridge 93 extending annularly around the inside edge of mounting clip 17 as shown in FIG. 1 and illustrated in detail in FIG. 7. As groove 91 and ridge 93 fit conformingly together, the longitudinal position of the rear surface of adapter cap 29 is appropriately positioned relative to housing 16 of charger 10 (see FIG. 1) so as to cause switch 92 to be depressed and bear against a stationary conductive button (reference numeral 94 in FIG. 6) located on the forward surface of charger housing 16. With groove and ridge type connections disposed on the apapter cap and charger, the connections serve to both position and hold the charger and a flashlight. Moreover, a single charger may accommodate flashlights of varying lengths. The groove 91, and also the grooves or ridges on the end caps discussed below, comprise means for indexing and holding the end caps, and the flashlights secured to the end caps, to chargers which include mating ridges and grooves. The cooperating ridges and grooves thus allow for the proper registration or positioning and holding of flashlights of varying lengths to a charger for electrical circuit connection. When a charger is to be used with flashlights of varying lengths, the front or forward mounting clamp 15, as shown in FIG. 1, may be omitted.

When switch 92 is depressed by conductive button 94, its contacts open, breaking the circuit inside the flashlight. As the contacts of switch 92 open, the metal body of switch 92, forming one side of the broken flashlight circuit, remains in contact with button 94 on the forward surface of charger 16. Switch body 92 corresponds to terminal 71' of the flashlight and button 94 corresponds to charger terminal 71, both as shown in FIG. 2. The other end of the flashlight circuit broken by switch 92, i.e., terminal 72' of FIG. 2, is connected to a conductive outer disc 95 surrounding but not touching switch 92 on the rear surface of cap 29. When flashlight 11 is mounted in charger 10, a spring loaded contact (reference numeral 97 of FIG. 6) protruding forwardly from the forward surface of housing 16 bears against disc 95 making electrical contact therewith. Disc 95 corresponds to charger terminal 72 as shown in FIG. 2.

The means by which switch 92 opens the circuit of flashlight 10 when switch 92 is depressed and the means by which flashlight terminals 71' and 72' are brought out via switch 92 and disc 95 is shown in detail in FIG. 4, which comprises a cross-sectional view of adapter cap 29.

Cap 29 comprises a hollow cylindrical housing 101 substantially closed at one end by an apertured transverse wall 102 and provided with threads 103 along its inside periphery at the end opposite wall 102, which threads permit cap 29 to be attached to the threaded rear end of flashlight 11. (See FIGS. 1 and 3). An external shoulder or boss 104 surrounds a circular cylindrical bore 105 located in and extending through the center of transverse wall 102. The inside cavity of cap 29 is divided into two sections, a forward section 106 and a rear section 107. Section 106 has a slightly larger bore diameter than section 107. An inner shoulder 108 is formed at the juncture of the two sections.

Cap 29 may be molded or machined from suitable insulating (non conductive) material, preferably a strong and rigid plastic material. Disc 95 is secured to the rear outer surface of transverse wall 102 by means of three rivets 111, 112, and 113 (see FIGS. 4 and 5) which pass through transverse wall 102 and through an inner conductive disc 114 which bears against the inner surface of wall 102. The rivets 111, 112, and 113 draw discs 95 and 114 tightly against opposite surfaces of wall 102. Disc 114 has a circular center opening greater than that of cylindrical bore 105, which extends through wall 102 and boss 104. Both discs 95 and 114 and rivets 111, 112, and 113 are electrically conductive, preferably being fashioned of copper or brass.

Switch 92 has the form of a round headed rivet, the cylindrical body of which passes inside cap 29 through bore 105 in rear wall 102 while the round head remains outside or externally of the rear wall of the housing. Just inside wall 102, and accordingly internally of the housing, a flat circular retaining clip 115 is snapped into an annular groove (not shown) in the cylindrical body of switch 92 which prevents the withdrawal of switch 92 from bore 105 and restricts the longitudinal movement of switch 92 within bore 105. In the rearward position of switch 92, retaining clip 115 bears against disc 114, while in the forward position of switch 92, the flat underside of the round head of switch 92 bears against the outer or exterior surface of boss 104. The maximum longitudinal displacement between forward and rear positions is preferably approximately 3/32 inches. Both switch 92 and retaining clip 115 are made of electrically conductive material.

Located inside cap 29 is an assembly comprising a number of individually fabricated parts which are secured to a coaxially arranged insulating cylindrical member 116. Insulator member 116 has an outer cylindrical shell 117 and a coaxially arranged inner cylindrical shell 118. The shells 117 and 118 are aligned coaxially with cap 29 and are joined at the forward end by a transverse web 119. The void between shells 117 and 118 forms a cavity 120 opening rearwardly towards wall 102 while the opening or bore inside inner shell 118 extends completely through insulator 116 and has an inside diameter which is adequate to allow clearance for the cylindrical body of switch 92 to enter therein. The individually fabricated parts secured to insulator member 116 comprise an insulator disc 121 having a rear conductive surface 122 secured to insulator 116 and a forward conductive surface 123 juxtapositioned to an insulating disc 124. A shallow conductive circular disc 125 is mounted on the forward side of disc 124 with a retaining rim opening outwardly or forward therefrom for receiving one end of a spiral coil spring 126. Spring 126 is secured, as by soldering or brazing, to disc 125 while disc 125 and insulator 124 are secured to insulator 121 by means of a rivet 127. Rivet 127 passes through a center hole in disc 125, insulator 124, conductive surface 123 and insulator 121 and makes electrical connection between disc 125 and the conductive surface 122 of insulator 121. However, the rivet makes no electrical contact with conductive surface 123 of insulator 121. Parts 121, 124, 125 and 126 thus connected together are mutually secured to insulator 116 by means of two additional rivets shown in FIG. 4 as rivets 128 and 129. Rivets 128 and 129 pass through insulator 121, conductive surface 122, add through the transverse web 119 of insulator 116 making electrical contact with forward conductive surface 123 of insulator 121 but making no contact with its rear conductive surface 122. The holes through the conductive surfaces 122 and 123 are sufficiently large to prevent unwanted electrical contact with the connecting rivets except as desired for proper electrical contact.

Two additional parts comprising a small inner coil spring 131 and a larger outer coil spring 132 complete the total complement of parts of adapter cap 29. The small spring 131 has an inside diameter just greater than the outside diameter of inner shell 118 of insulator 116 and is contained within the cavity 120 between shells 117 and 118. It extends between web 119, and rivets 128 and 129 extending therethrough, and retaining clip 115. The larger spring 132 surrounds outer shell 117 and extends between conductive surface 122 and disc 114.

With the aforementioned parts of adapter cap 29 positioned inside housing 101, the rear conductive surface 122 of insulator 121 rests against inner shoulder 108 of end cap 29 when cap 29 is threadedly attached to barrel housing 26 of flashlight 11, as shown in FIG. 3. Spring 126 bears against and makes electrical contact with the base of battery 84 (see FIG. 3) which constitutes the negative terminal of battery 74 shown in FIG. 2, while the conductive strip 88 (see FIG. 3, again) extending longitudinally along the inner surface of barrel housing 26 of the flashlight, bears against forward conductive surface 123 of insulator 121 making electrical contact between surface 123 and one terminal of lamp 73 through flashlight switch 31 (see FIG. 3, again).

Outer spring 132 is compressed between disc 114 and rear conductive surface 122 of insulator 121, making electrical contact therebetween.

Inner spring 131 is compressed between the forward surface of clip 115 and the forward end of the cavity 120 between shells 117 and 118 where spring 131 bears against the heads of rivets 128 and 129. Spring 131 thus urges switch 92 rearwardly, causing clip 115 to bear heavily against disc 114. At the same time spring 131 also makes electrical contact between clip 115 and the rivets 128 and 129, provided the flashlight is not installed in the energize or charging apparatus. When the flashlight is so installed, switch 92 is biased against the urging of spring 131 and the clip 115 is thus moved away from disc 114.

A closed electrical circuit may be traced for normal operation of the flashlight beginning with the longitudinal conductive strip 88 running along the inside of barrel housing 26 (see FIG. 3) which contacts the forward conductive surface 123 of insulator 121. The circuit extends through rivets 128 and 129, through spring 131, clip 115, disc 114, spring 132, rear conductive surface 122 of insulator 121, rivet 127, disc 125 and coil spring 126 to the negative terminal of battery 83, through batteries 84, 85, 86, and 87 (represented collectively as battery 74 in FIG. 2), and lamp 73, and back to the longitudinal conductive strip 88, switch 31, and to surface 123. The flashlight may thus be operated normally under the on/off control of switch 31. The construction described is based on the requirement that contact 92 be the positive and disc 95 be the negative conductor. A considerably simplified construction will result in cases where this special requirement is not present. If the flashlight housing 26 (see FIGS. 1 and 2) were metal, the conductive strip 88 between conductive surface 128 and switch 31 would not be required.

Now if flashlight 11 is installed in battery charger 10 with groove 91 of cap 29 being longitudinally positioned by ridge 93 of rear mounting clamp 17, switch 92 is depressed as it bears against button 94 of housing 16. As switch 92 is thus depressed and driven into cap 29, electrical contact is broken between clip 115 and disc 114. Switch 92, however, remains in electrical contact with spring 131 which connects electrically through rivets 128 and 129 to forward conductive surface 123 and thence through the longitudinal conductive strip 88 to one side of lamp 73 through switch 31. Switch 92 thus now constitutes flashlight terminal 71' as represented in FIG. 2. At the same time, spring loaded contact 97 of charger housing 16 bears against disc 95 on the rear surface of cap 29 making electrical contact therewith. Disc 95 still connects electrically through rivets 111, 112, 113, which rivets are shown in FIG. 5, disc 114, spring 132, surface 122, rivet 127, disc 125, and spring 126 to the base of battery 84 which constitutes the negative terminal of battery 74 as shown in FIG. 2, and disc 95 thus constitutes terminal 72' of FIG. 2.

FIG. 5 is a view of the apparatus of FIG. 3 taken generally along line 5—5 of FIG. 3. It comprises an end view of the end cap 29 of the flashlight 11. The end cap has been discussed in detail in conjunction with FIG. 4.

The end view of end cap 29 shows the switch 92 centrally located, coaxially, with respect to the end cap and to disc 95. The disc 95 is secured to the wall 102 of the end cap. The wall 102 is the rear portion of the housing 101.

FIG. 6 is a view of the apparatus of FIG. 1 taken generally along line 6—6 of FIG. 1. It comprises a view of the front end of housing 16.

A pair of electrical contacts extend outwardly from the housing to make contact with the end cap 29. A stationary conductive button 94 is centrally disposed between the sides of the housing and vertically positioned to make contact with switch 92 of the end cap.

A spring loaded contact 97 extends outwardly from the housing away from the vertical center line, or offcenter. It makes contact with disc 95 which is secured to the rear wall 102 of the housing 29.

As discussed above in conjunction with FIG. 4, contact 97 corresponds to the charger terminal 72 of FIG. 2, and contact 94 corresponds to the charger terminal 71 of FIG. 2.

Extending upwardly from the top surface of housing 16 is switch 21 and lamp 22. The switch, described above as a push-button type switch, could also be of any other appropriate type. With the switch 21 in the full charge position, indicator lamp 22 (and lamp 23, shown in FIG. 1) will glow, indicating the full charge status.

Rear mounting clamp 17, as shown in FIG. 7, has a generally rectangular outline which is pierced by a circularly extending aperture 133. The aperture 133 opens upwardly through a flared passage 134 which grows wider as the upper end of clamp 17 is approached. The ridge 93, which was referenced earlier in the description, transverses the entire lengths of both sides of passage 134 and of aperture 133 and cooperates with the annular or circumferentially extending groove 91 (see FIG. 4) on the external periphery of the end cap 29 to provide appropriate registration between the end cap, and the flashlight secured thereto, and of which it is a part, and the charger.

The diameter of aperture 133 is only slightly less than the width of the rectangular outline of clamp 17 and the aperture 133 along with passage 134 thus divide clamp 17 vertically into two opposite upwardly extending arms 135 and 136. Arm 135 is integral with the base of clamp 17. Clamp 17 is secured to base 14 of charger 10 (see FIG. 1) by two screws 137 and 138. Arm 136, however, is severed from the main body of clamp 17 and is pivotally mounted at its lower extremity by means of a pin 139 which passes through a mating hole in the stationary base of clamp 17, the pivotal mounting allowing arm 136 to move away from the center of circular opening 133, thereby opening passage 134 and allowing the entering of cap 29 as flashlight 11 is installed for charging. A tension coil spring 141 running horizontally inside the stationary base of clamp 17 and into a short passage inside arm 136 is secured at one end by means of a pin 142 to the stationary base of clamp 17 and at the other end by means of a pin 143. The pin 143 is positioned above pivot pin 139 so that spring 141 draws arm 136 toward the center of aperture 133 causing flashlight 11 to be gripped firmly between arms 135 and 136. The annular groove 91 of end cap 29, as shown in FIG. 4, receives the ridge 93 of the clamp to hold and to position the flashlight in the charger.

Figure 8:
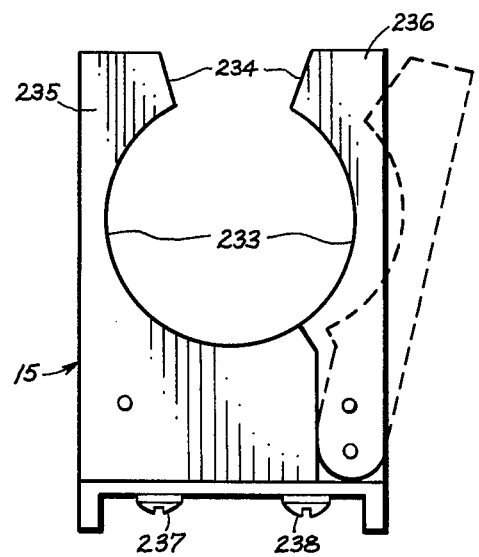
FIG. 8 is an end view of the forward mounting clamp associated with the battery charger apparatus of FIG. 1 taken generally along line 8—8 of FIG. 1.

FIG. 8 is a view of the apparatus of FIG. 1 taken generally along line 8—8 of FIG. 1. It comprises a view of forward mounting clamp 15 with flashlight 11 removed from the clamp. Forward mounting clamp 15 is identical to rear mounting clamp 17 except that clamp 15 has no ridge corresponding to ridge 93 of passage 134 or aperture 133, the passage and aperture of clamp 15 having been cut perpendicularly relative to the front and rear surfaces of clamp 15. The flat edges in the example described are preferred in the case of clamp 15 because clamp 15 is required to only grip the cylindrical barrel of flashlight 11 and does in this case not aid in the longitudinal positioning of the flashlight.

The clamp 15 is disposed on elongated base 14 (see FIG. 1), and secured thereon by a pair of screws 237 and 238. The clamp Includes an aperture 233 and an upwardly extending passage 234, substantially identical to clamp 17. A pair of arms 235 and 236 extend upwardly from the base. Arm 235 is integral with the base while arm 236 pivots to allow the flashlight housing to be received into aperture 233. The arms are spring biased together, substantially the same as for clamp 17 of FIG. 7. The groove and ridge arrangement in end cap and clamp securing the flashlight in the desired position in relation to the charger body will permit the total elimination of forward clamp 15 when light-weight, short bodied flashlights are used.

Figure 9:
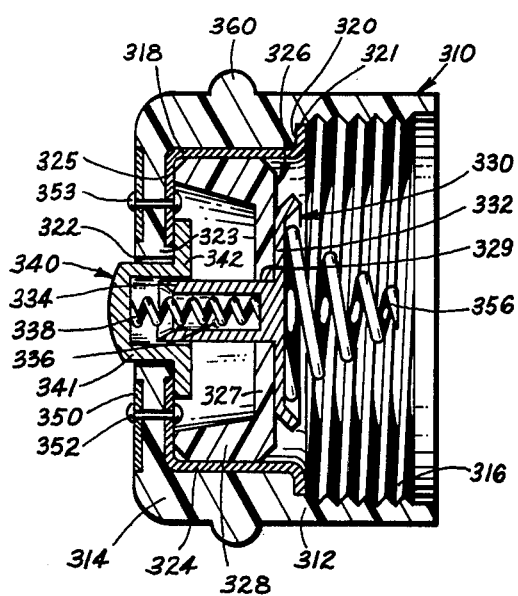
FIG. 9 is a cross sectional view of an alternate embodiment of an adapter end cap for a flashlight with a plastic body.

FIG. 9 is a view in partial section of an alternate embodiment of an adapter end cap. The differences between the end cap of FIG. 9 and end cap 29, discussed in detail above, centers on two features, one a ridge about the exterior periphery of the end cap and a different electrical contact or circuit system for making appropriate electrical contact with the charger apparatus.

End cap 310 in FIG. 9 includes a cylindrical housing 312 which is generally hollow, and closed by a rear wall 314. Within the housing 312 are two bores, a first or outer cavity or threaded bore 316, and a second or inner cavity or bore 318. The first or threaded bore 316 is of greater diameter than is the second bore 318. A shoulder 320 is defined between the first and second bores. The rear wall 314 comprises the rear wall, also, of the second bore 318.

An aperture 322 extends centrally, or coaxially, through the rear wall 314 and accordingly communicates with the second bore 318. Within the second bore 318 is an interior boss 323, formed around the aperture 322 on the interior of the rear wall 314.

A conductive cup 324 is disposed within end cap 310, with the cup extending peripherally within the second bore 318, and with a radially outwardly extending flange 321 disposed against the shoulder 320, and with a second flange 325, extending radially inwardly, disposed against the end or rear wall 314 between the bore wall and the interior boss 323. The thickness of the conductive cup is slightly greater than the height or length of the boss 323 within the bore 318, so that the radially inwardly extending flange 325 of the conductive cup is above the surface of the boss.

A circular insulating cup 326 is disposed within the conductive cup 324. The insulating cup 326 includes a bottom portion 327 and a rim portion 328. The rim portion is generally cylindrical in configuration, and it is disposed against the flange 325 of the conductive cup 324. The bottom portion 327 of the insulating cup includes an aperture 329 extending therethrough, generally coaxial with the aperture 322, but spaced apart therefrom.

A conductive member 330 is disposed against the bottom portion 327 of the insulating cup 326 and facing generally outwardly towards the threaded bore 316. The conductive member includes a disc portion 332 which is disposed against the bottom portion 327 of the insulating cup, and a cylindrical portion 334 which extends through the apertures 329 in the insulating cup within the second bore 318. The cylindrical portion 334 of the conductive member includes an interior bore 336 in which is disposed a conductive compression spring 338.

A switch 340 extends through the aperture 322 in the rear wall 314 of the end cap. The switch includes a head 341, which extends outwardly or rearwardly beyond the rear wall 314 of the end cap, and a circular flange 342, which extends radially outwardly within bore 318 and within the insulating cup 326. The compression spring 338 extends between the conductive member 330 and the switch member 340 and provides a bias therebetween. As shown in FIG. 9, when the switch 340 is biased by the spring 338, the flange 342 of the switch makes electrical contact with the inwardly extending or inside flange 325 of the conductive cup 324.

In a recess on the exterior of the rear wall 314 of the end cap is disposed an annular conductor 350. The conductor is secured to the end cap by a plurality of rivets, of which rivets 352 and 353 are shown in FIG. 9. The rivets extend between the annular conductor 350 and the inside flange 325 of the conductive cup 324 to secure both the annular conductor and the conductive cup together to the end cap and also to provide electrical contact or connection therebetween. The rivets are accordingly made of a conductive material to provide the necessary electrical contact.

A spiral compression spring 356, also made of a conductive material, is disposed within the threaded bore 316 and against the disc portion 332 of the conductive member 330. The spring also makes contact with a battery within a flashlight when the end cap is screwed onto a flashlight. Such an arrangement is illustrated in FIG. 3, with end cap 29 secured to flashlight 11, and with spring 126, which is substantially the same as spring 356, in contact with a battery 84.

When end cap 310 is on a flashlight and the flashlight is not in a charger, electrical contact is provided between the spring 356 and the conductive cup 324 by the switch 340 through its flange 342 which is in electrical contact with the inwardly extending flange 325 of conductive cup 324. The switch 340, with its head 341 in electrical contact with spring 338, in turn is in electrical contact through conductive member 330 and through spring 356 with a battery. Accordingly, an electrical circuit is maintained between a battery, against which spring 356 bears, and the radially outwardly extending flange 321 of conductive cup 324 and through a conductive strip, such as conductor 88 of FIG. 3, and from thence through a switch and to a lamp in a flashlight.

A ridge 360 extends circumferentially about the outer periphery of the housing 312 of the end cap 310. Rather than having a groove, such as groove 91 of end cap 29, the end cap 310 includes the annular, circumferentially extending ridge 360.

When a flashlight with end cap 310 secured thereto is placed in a charger, an electrical contact on the charger housing exerts a force against switch 340, which moves the switch against the bias of spring 338, and moves the flange 342 of the switch away from the inside flange 325 of the conductive cup 324. Accordingly, electrical contact of a single circuit is broken, enabling the charger to charge the batteries, as discussed above in conjunction with the circuitry of FIG. 2. Obviously, at the same time electrical contact is made between the charger and switch 340, another electrical contact is made between the charger and the annular conductor 350. The electrical circuitry within the end cap 310 is then broken into two separate circuits, one extending between the switch 340 and the spring 356 through the spring 338 and conductive member 330. The second conductive circuit extends from the annular conductor 350, disposed in a matching annular recess on the rear wall 314 of the end cap, through the rivets 352, 353 to the conductive cup 324, which is secured to the annular conductor by the rivets at the inside flange 325 of the cup 324.

Figure 10:
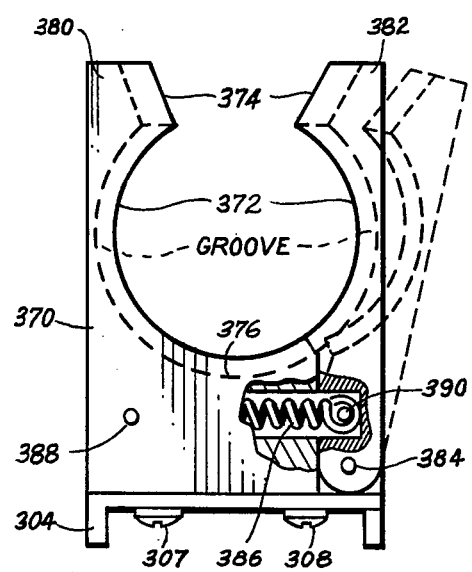
FIG. 10 is a perspective view, partially broken away, of a rear mounting clamp for the end cap of FIG. 9.

FIG. 10 is an end view, similar to that of FIG. 7, of a clamp for receiving the end cap 310 of FIG. 9. The clamp 370 is disposed on a base 304 and is secured thereto by a pair of screws 307 and 308. The base 304 and the screws 307 and 308 correspond respectively to the base 14 of FIGS. 1 and 7, and to the screws 137 and 138 of FIG. 7. The clamp 370 includes an aperture 372 and a passage 374, which correspond respectively to aperture 133 and passage 134 of clamp 17 as illustrated in FIG. 7, and as discussed above in detail. However, the clamp 370 differs from the clamp 17 in that clamp 370 includes a groove 376 which extends along the interior periphery of both the aperture 372 and the passage 374. The groove 376 receives the ridge 360 when the flashlight, with end cap 310 secured thereto, is disposed in the clamp. Since the aperture 370 is circular in shape, and the passage 374 is outwardly extending, it receives and holds the end cap 310 and positions the end cap for appropriate charging, as with the charger of FIG. 1, including the housing 16 and the electrical contacts 94 and 97 as illustrated in FIG. 6.

In order to receive the end cap 310, the clamp 370 includes a pair of upwardly extending arms, arm 380 and arm 382. The arms 380 and 382 correspond to arms 135 and 136 of clamp 17. Arm 382 pivots on a pivot pin 384 to allow the end cap to be inserted within the clamp. The movable arm 382 is biased by a tension spring 386 which extends between a pin 388 on fixed arm 380 of the clamp and a pin 390 in the movable arm 382 above the pivot pin 384. The action of the pivoting of arm 382 is substantially the same as that of arm 136 of clamp 17. Indeed, the only difference between the two is that clamp 370 includes the groove 376 to receive the ridge 360 of end cap 310, while clamp 17 includes a ridge to mate with a groove on the end cap.

Figure 11:
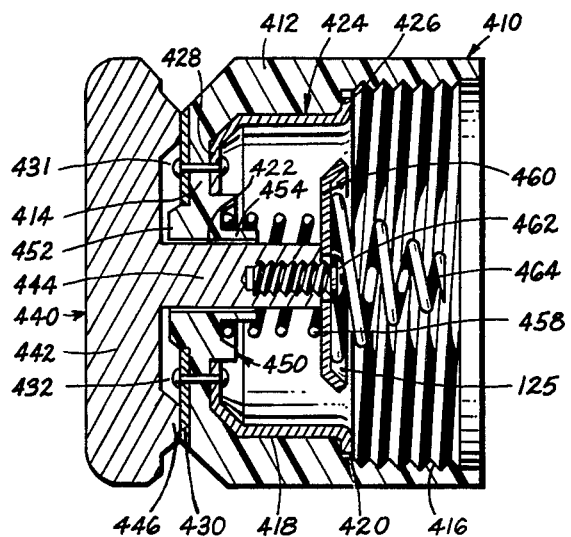
FIG. 11 is a cross sectional view of still another alternate design adapter end cap for a flashlight with a plastic body.

FIG. 11 is another alternate embodiment of adapter end cap apparatus, and it comprises a view in partial section, disclosing the components which are included in the electrical circuitry of the end cap.

FIG. 11 discloses an end cap 410, which, like the other end caps heretofore discussed, is fabricated out of nonconductive material. The end cap 410 includes a cylindrical housing 412 closed at one end by rear end wall 414. The end cap, like the other end caps, is open at the end opposite the rear end wall 414. Within the end cap is a pair of bores, a first bore, threaded bore 416, and a second bore, recessed bore 418. At the juncture of the two bores is a shoulder 420. The shoulder is radially extending. A relatively large aperture 422 extends through the end wall 414 and provides communication between the exterior of the end cap and the recessed bore 418.

Disposed within the recessed bore 418 is a conductive cup 424, which generally conforms to the interior configuration of the recessed bore. The conductive cup includes a radially outwardly extending flange 426, which is disposed on the shoulder 420, and a radially inwardly extending flange 428, which is disposed on the end wall 414 about the aperture 422.

An annular conductor 430 is disposed on the exterior of the rear end wall 414 about the aperture 422. A plurality of conductive rivets, such as rivets 431 and 432, extends through the end wall 414 to secure together the annular conductor 430 and the conductive cup 424. The rivets extend through the radially inwardly extending flange 428 of the conductive cup and accordingly secure the conductive cup to the end cap and also secure the annular conductor 430 to the end cap. They also provide an electrical path between the annular conductor 430 and the conductive cup 424.

A conductive switch 440 is disposed externally of the end cap and a portion of the switch extends through aperture 422 of the end cap. The conductive switch includes a head 442, which is of a substantially large diameter, about the same diameter as the cylindrical housing 412 of the end cap. The conductive switch also includes a stem or shank portion 444 which extends through the aperture 422 in rear end wall 414 of end cap 410.

Within the recessed bore 418, and coaxially disposed about the aperture 422, is a cylindrical portion 450 of the end wall 414. The end wall 414 also includes an outwardly extending boss 452 about the aperture 422. The annular conductor 430 is disposed radially outwardly of the boss 452. The shank 444 of the conductive switch 440 extends through the aperture 422, and accordingly through cylindrical portion 450 and boss 452 of the end wall 414. Electrical contact between the shank 444 and the annular conductor 430 is prevented by boss 452.

The flange 428 of conductive cup 424 is disposed adjacent the cylindrical portion 450 within the bore 418 and is juxtaposed against the inside of the wall 414.

The cylindrical portion 450 includes a circularly extending recess 454 which receives one end of a helical compression spring 458. Electrical contact between the spring 458 and the shank 444 is prevented by the cylindrical portion 450.

Conductive switch 440 includes an annularly or circularly extending rim 446 which makes electrical contact with the annular conductor 430.

A conductive disc 460 is secured within the bores 416 and 418 to the shank 444 of conductive switch 440, by appropriate fastening means, such as screw 462 which extends into a tapped (threaded) bore in the shank 444. A spiral compression spring 464 extends outwardly within the threaded bore 416 from the conductive disc 460. The spring 464 makes contact with the negative terminal of a battery in the flashlight to which the end cap 410 is secured.

The compression spring 458 extends from the recess 454 of the cylindrical portion 450 to the conductive disc 460, which is secured to switch 440. The spring 458 extends about the stem or shank 444 of the switch 440. The spring provides a bias between wall 414 and the conductive disc 460 to bias the conductive switch 440 into electrical contact with the annular conductor 430. Under the bias of spring 458, the rim 446 of the head of the conductive switch is biased into electrical contact with the annular conductor 430. The recess 454 of cylindrical portion 450 of the end wall 414 serves as an anchor or fixed point from which to exert a bias against the disc 460, which is secured to the conductive switch 440.

An electrical circuit accordingly is made between the spring 464, through the conductive disc 460, the conductive switch 440, the annular conductor 430, through the rivets 431, 432 to the conductive cup 424, and to a flat conductor, such as conductor 88, (see FIG. 3) which extends into the end cap from the body or cylinder of a flashlight. This allows the flashlight to be used or operated normally with its own on-off switch.

When the flashlight with the end cap 410 secured thereto is placed in charging apparatus, the conductive switch 440 is biased outwardly from the end wall 414 and against the bias of compression spring 458, which breaks the electrical contact between the rim 446 of the head 442 of the conductive switch and the annular conductor 430. A pair of circuits now exists, one circuit between the conductive switch 440 and the spring 464 through the conductive disc 460, and the second circuit between the annular conductor 430 and the conductive cup 424 through the rivets 431 and 432.

Figure 12:
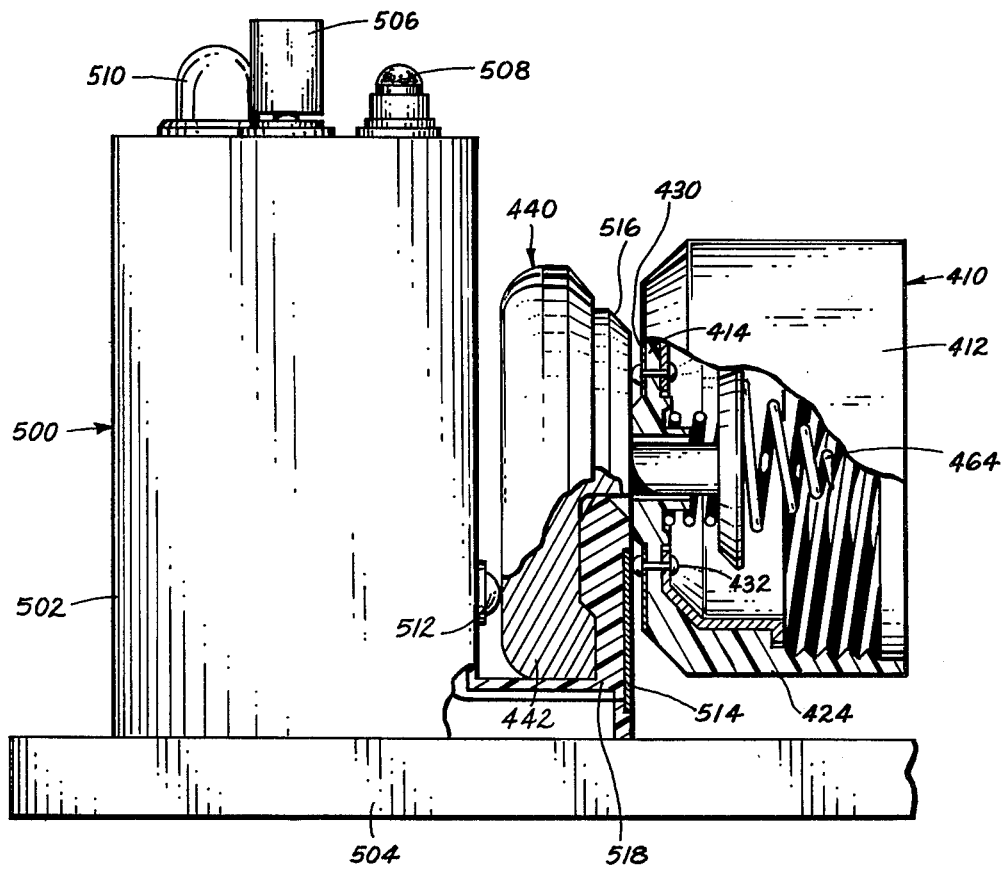
FIG. 12 is a side view, partially broken away, of a charger apparatus including the apparatus of FIG. 11.

FIG. 12 is a side view in partial section of the end cap 410 of FIG. 11 disposed in charger apparatus for charging. The end cap 410 is shown disposed against charger apparatus 500. The charger apparatus 500 includes a housing 502 disposed on a base 504. On top of the housing is a switch 506 and a pair of indicator lamps 508 and 510. At the lower portion of the housing 502 adjacent the end cap 410 is a contact 512. As indicated, the contact 511 is the negative terminal for charging batteries in a flashlight. The terminal 512 makes contact with the conductive switch 440 of the end cap 410. The polarity of end cap 410, and also the polarity of end cap 310 is reversed from that shown in FIG. 4. That is, the switch 340 of end cap 310 and the switch 440 of end cap 410 make contact directly with the negative terminal of a battery disposed in the flashlight housing, while the embodiment of FIG. 4, switch 92 makes contact with the positive terminal of a battery through conductor 87. (See FIGS. 3 and 4).

The charging apparatus 500 includes a nonconductive cradle 516 which is a generally vee shaped notch. It includes a wedge portion 518 at the lower or bottom of the vee. The cradle receives the end cap 410, and provides a camming surface for drawing the conductive switch 440 outwardly with respect to the cylindrical housing 412 and the rear end wall 414 of the end cap, thus opening the switch by breaking electrical contact between the rim 446 of the switch and the annular conductor 430. The wedge portion provides sufficient camming action to bias the head 442 of the conductive switch against the contact 512.

Disposed against the outside of the cradle 516, and adjacent the wedge portion 518, is a conductive contact strip 514 which makes electrical contact with the rivets, such as rivet 432, to provide electrical contact with the second circuit in the end cap when the rim of the conductive switch is biased out of electrical contact with the annular conductor 430.

The cradle 516 is shown directly connected to the housing 502, and the contact strip 514 is also directly connected to the electrical circuitry within the housing 500 by appropriate electrical concuctors. The simplified version shown in FIGS. 11 and 12 eliminates the mounting clamps with their pair of arms and accordingly is a simplified and more economical apparatus, entirely adequate for many types of flashlights and many applications.

Figure 13:
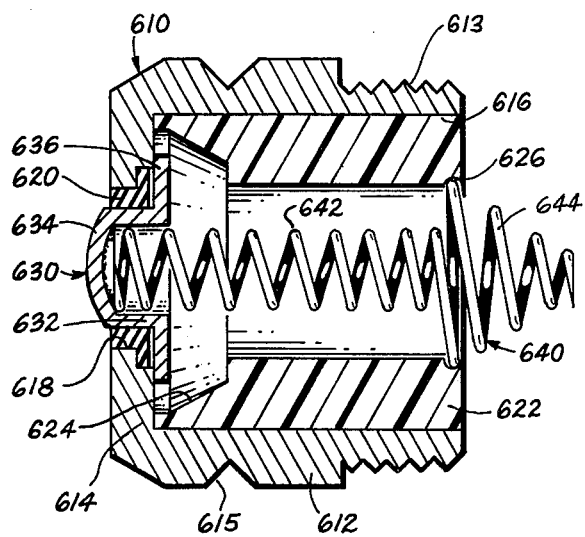
FIG. 13 is a view in partial section of an alternative embodiment of an adapter end cap for use with metallic flashlights.

FIG. 13 is a view in partial section of another modification of an end cap for use with the flashlight and charger apparatus of the present invention. The end cap illustrated in FIG. 13 is made of a conductive metal and is specifically for use with a flashlight having a metal body or housing. An end cap 610 is shown in FIG. 13 which includes a cylindrical housing 612 closed at one end by an end wall 614. The opposite end of the cylindrical housing 612 is open, terminating in an outer end 617. Within the cylindrical housing is a bore 616, which is open on one end, towards the flashlight (not shown). At the closed end of the bore, and extending through end wall 614, is an aperture 618. The aperture 618 includes a shoulder, which separates or divides the aperture into a larger diameter portion and a lesser diameter portion, with the larger diameter portion opening into the bore 616. An annular insulator 620 is disposed in the aperture 618, and is secured therein against the shoulder of the aperture.

Another insulator, insulator shell 622, is disposed within bore 616 and it extends from the end wall 614 outwardly substantially coaxially and coextensive with the bore 616 in the cylinder housing 612. The inner portion of the insulator shell 622 is disposed against the inside of end wall 614, and the insulator shell terminates at an outer end 623 substantially flush with the outer end 617 of the cylinder housing 612. Extending generally axially of the insulator shell 622 from adjacent end wall 614 is a pair of bores 624 and 625. The bore 624 extends for a short axial distance from the inside of the end wall 614, while the bore 625 extends a relatively long axial distance for the balance of the length of the insulator shell. Between the bores 624 and 625 is a shoulder 626. The axial length of the bore 624, from the proximal end of the shell 622 adjacent the inside of the end wall 614 to the shoulder 626, minus the thickness of flange 636, is less than the thickness of the end wall 614, and accordingly is less than the length of aperture 618 and of the insulator 620 disposed in the aperture 618. The distal end of insulator shell 622 adjacent end 623 includes a shoulder 627 extending radially outwardly from the bore 625 on the inner periphery of the insulator shell adjacent the end 623 of the shell 622 and substantially perpendicular to the bore 625. An outwardly flaring conical portion 628 extends from the shoulder 627 to the distal or outer end 623 of the shell.

A switch 630 extends through the annular insulator 620 disposed in the aperture 618 in end wall 614. The switch includes an elongated cylindrical portion 623, part of which is movable within the insulator 620 within the aperture 618, and part of which extends axially into the bores 624 and 625 of the insulator shell 622. The switch also includes a head portion 634 secured to the cylindrical portion 632, and which extends outwardly from the end wall 614 and is thus disposed externally of the housing 614. It is of a general convex configuration outwardly of the end cap. The switch also includes a radially outwardly extending flange 636 disposed within the bore 616 of the end cap, and within the bore 624 of the insulator shell 622. The flange is secured to the cylindrical portion 632. The overall diameter of the flange 636 is greater than the diameter of the bore 625 of the insulator shell 622. The wall thickness, length of bore 624, and thickness and diameter of flange 636 prevent the switch from moving out of the aperture in the end wall.

The cylindrical portion 632 fits relatively tightly within the annular insulator 620 and yet moves freely. The relatively tight fit helps to prevent dirt, moisture such as rain, and foreign particles from entering into the end cap. Moreover, the switch 630 cannot be pushed out of the insulator 620 and into the interior of the end cap because the flange 636 contacts the shoulder 626 while part of the cylindrical portion 632 is still in the insulator 620. This is due to the relative dimensions of the end wall 614 and the bore 624, as discussed above. Since the switch cannot be pushed out of the insulator 620, the interior of the end cap is further protected against the intrusion of foreign matter, dirt, moisture, etc., and it is thus extremely unlikely that any such foreign matter could prevent the apparatus from functioning.

A conductive spring is used to provide electrical connection from the switch contact, at the end wall 614 of the housing, to a flashlight battery at the outer end 617 of the housing, disposed remotely from the end wall. The spring also serves to bias the switch contact against the inside of the end wall and accordingly to bias a portion of the switch contact out of the housing.

A compression spring 640 is disposed within the cylinder housing about the cylindrical portion 632 and it extends from the switch 630 through the end cap and terminates in its extended configuration outwardly of the end cap beyond outer end 617. The compression spring 640 is comprised of two portions, a helical portion 642 which extends from the flange 636 of the switch 630 coaxially of the bore 616 of the end cap and it terminates adjacent the shoulder 627 of the insulator shell 622. The second portion of the spring is a spiral portion 644 which begins with a large diameter coil 643 and extends outwardly of the end cap and is adapted to bear against the end, the negative terminal, of a battery disposed in a flashlight. The largest diameter coil 643 of the spiral portion 644 of the spring is of a slightly greater diameter than the bore 625 and is disposed against the shoulder 627. The spring is self-centered by the camming action of the coil 643 against the flaring portion 628 of the insulator shell. When the end cap is secured to a flashlight, the spring 640 is under compression with the coil 643 seated on shoulder 627. Both the helical portion and the spiral portion are under compression with the spiral portion biased against a battery. The helical portion 640 provides a bias against the switch 630 through the flange 636 to bias the switch against the end wall 614. Also, the spring bias together with the close tolerances and the design of the end cap, switch, and in insulators, as discussed above, provide an inherent self cleaning ability for the apparatus. For example, should the flashlight be dropped on muddy ground directly on the end wall and the switch be depressed within the insulator 620 so as to allow mud and other foreign matter to enter into the outer portion of the insulator bore during the drop, the bias of the spring 640 against the switch forces outwardly any such mud and foreign matter when the flashlight is picked up.

Under the biasing force of the spring, the flange 636 of the switch makes electrical contact with the interior of the end wall 614 to provide an electrical circuit between the compression spring, 640, which is of a conductive metal, through the switch 630 and through the end cap 610, as previously discussed, foreign material cannot get between the flange 636 and the end wall to prevent operation of the flashlight because the cylindrical portion 632 and the head 634 remain in the insulator 620 in the aperture 618 at all times when the end cap is secured to a flashlight.

The configuration of spring 640, with the shoulder 627 in the insulator shell 622, is primarily employed with flashlights using larger diameter batteries, such as D size batteries. With batteries of lesser diameter, such as C size batteries, the spring may be of constant diameter and the shoulder 627 may accordingly be omitted, if desired.

When a flashlight with the end cap adapter 610 is having its battery(ies) charged, the head 634 of the switch 630 is disposed in a charger and the switch is displaced inwardly against the bias of the helical portion 642 of the spring 640. The electrical contact between the switch and the end cap is accordingly broken. The flashlight circuit is thus converted to a direct current source for charging the flashlight battery(ies) when the flashlight switch is closed and when the switch contact is moved to one position, with the flange of the switch biased away from the end of the housing. With the switch contact in a second position, with the flange against the end wall, the flashlight is available for normal use. This provides two separate electrical circuits in the cap, depending on the position of the switch. The one electrical circuit is through the cylindrical housing of the cap itself for operating the flashlight out of the charger, and the second electrical circuit is from the switch 630 through the spring 640 to the negative terminal of a battery disposed in the flashlight for battery charging.

The end cap 610 includes threads 613, which are illustrated as external threads on the outside of the bore 616 of the end cap. For metal bodied flashlights which have internal threads, the external threads as shown are used. For metal bodied flashlights which have external threads, internal threads in place of threads 613, are used. Obviously, whether the threads are internal threads or external threads is dependent solely on the particular type of flashlight with which the end cap is to be used.

The cylinder housing 612 includes a groove or recess 615, illustrated as being generally vee shaped, extending circumferentially about the exterior periphery of the end cap. As disclosed above in conjunction with other end cap embodiments, the groove or recess 615 is designed to receive a matching or mating ridge of a charger clamp to position and hold the end cap, and the flashlight to which it is secured, in an appropriate operative position during charging operations.

Within cylindrical portion 632 of the switch 630 is a bore 633 which may receive the base of a spare lamp or bulb 674. The spare lamp may be held in place by a piece of foam rubber or the like. The end cap thus provides storage space for carrying a spare lamp.

Figures 14, 15:
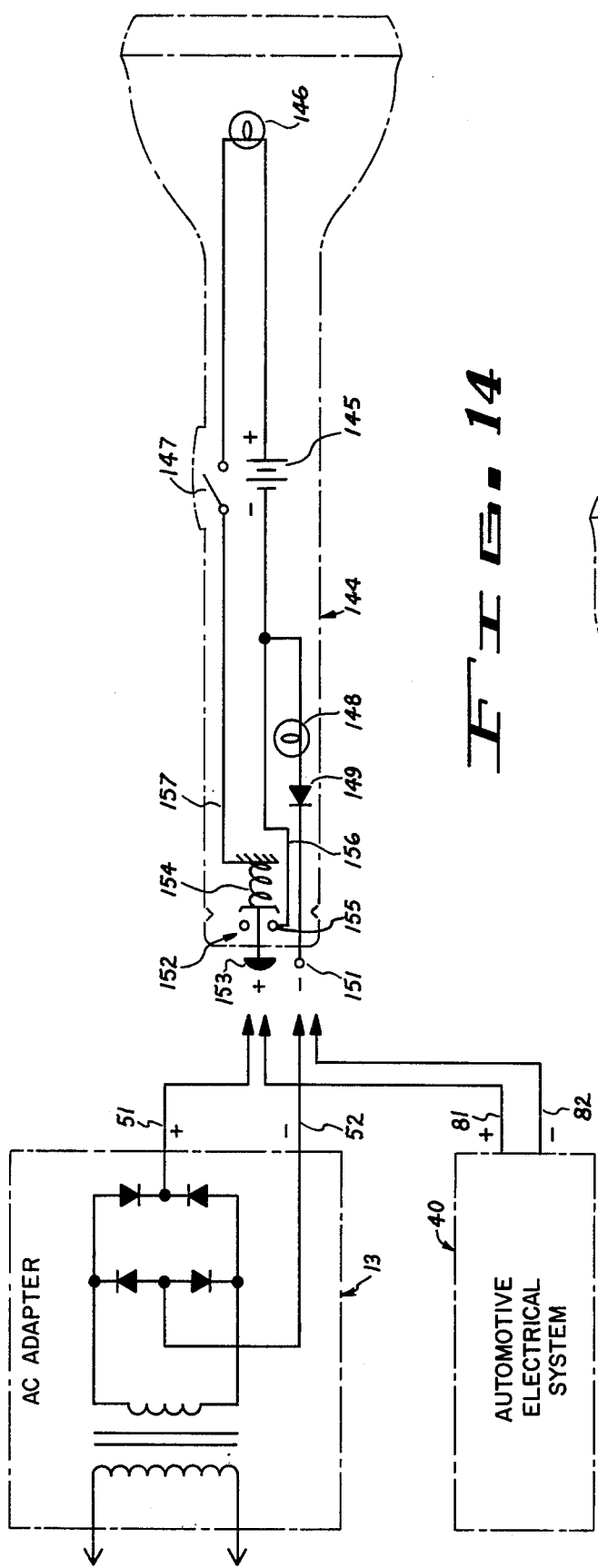
FIG. 14 is a schematic circuit diagram of an alternate embodiment of the charger and flashlight apparatus shown in FIGS. 1–8 with the flashlight containing a built-in charger.
FIG. 15 is a schematic circuit diagram of an alternate embodiment of the apparatus of FIG. 14.

An alternate embodiment of the invention is shown schematically in FIG. 14. It comprises a flashlight 144 with a built-in charger. The flashlight 144 is designed to utilize either the ac adapter 13 or the battery of an automobile's electrical system 40, both of which are shown in FIG. 2. The circuit of ac adapter 13 is here identical to the one described in connection with the first embodiment. Similarly, the automotive circuitry is substantially the same as shown in FIG. 2, with terminal 83 omitted.

The electrical elements of the flashlight 144 include rechargeable batteries 145, a flashlight bulb or lamp 146 and an on/off switch 147, which are associated with the flashlight itself. In addition, a charger lamp 148, a blocking diode 149, a contact 151, and a special charger switch 152 are included.

The charger switch 152 may be implemented in a manner similar to the implementation of switch 92 of the embodiment of FIGS. 1–4, as a separate end cap, or may be implemented as an integral part of the flashlight housing. Switch 152 utilizes a push button 153 which is restrained in a closed position by a spring 154. In the closed position, electrical contact is made between push button 153, which is electrically conductive, and a contact surface 155. The contact surface 155 is tied into the flashlight circuit by a conductive element or conductor 156. Push button 153 is tied into the flashlight circuit through spring 154 and a conductive element or conductor 157. Conductive elements 156 and 157 may be in the form of copper wires or other conductive hardware incorporated into the mechanical structure of the flashlight.

When flashlight 144 is not coupled either to the ac adapter 13 or to the automobile electrical system 40, switch 152 is closed through contact surface 155. If on/off switch 147 is also closed, current flows from the positive terminal of battery 145 through lamp 146, switch 147, element 157, spring 154, push button 153, contact surface 155 and element 156 to the negative terminal of battery 145. The lamp 146 is thus energized in the normal operating manner.

In the charging mode, either the output terminals 51 and 52 of adapter 13 or the output terminals 81 (or 83) and 82 of electrical system 40 are coupled to push button 153 and contact 151. In either case, the electrical conductors or cables interconnecting these points interface with flashlight 144 through the special end cap or special housing configuration, and through the holder provided to store the flashlight when not in use and which attaches to the flashlight 144. The mechanical connection between the flashlight and its holder results in depressing push button 153 of the switch 152. Electrical contact between surface 155 and push button 153 is accordingly broken, while at the same time electrical connection is made to push button 153 and contact 151 from the charging energy source, either from adapter 13 or from electrical system 40.

By way of example, it will be assumed that connection is made for charging from electrical system 40, in which case push button 153 is depressed and connected to terminal 81 or 83, and contact 151 is connected to terminal 82. Switch 152 is now open. To charge battery 145, it is necessary again to close on/off switch 147 whereupon a charging current flows from positive terminal 81 or 83 through push button 153, spring 154, conductive element 157, switch 147, lamp 146, battery 145, lamp 148, diode 149 and contact 151 to negative terminal 82. Lamp 148 serves as a charge indicator, as a charge current limiter, and as a fuse, as did lamps 22 and 23 of the first embodiment, and diode 149 serves the same functions as provided by diode 75 of the first embodiment.

FIG. 15 is a schematic drawing of an alternate adaptation of the circuit of FIG. 14, showing that the charging energy may be inserted at any point of the flashlight circuitry. While in previous descriptions the charging energy was inserted between the flashlight switch and the negative battery terminal, such as switch 147 and negative terminal of battery 145 in FIG. 14, FIG. 15 shows the insertion point between negative terminal of battery 145A and positive terminal of battery 145B. The charging current path is the same as in previously disclosed circuits of this invention.

FIGS. 14 and 15 are schematic representations only. Obviously the entire charging circuit shown therein could be disposed in the end caps, including the current limiting and indicating bulbs 148 and 149. Moreover, if such were desired, another such bulb, and a switch to connect and disconnect the bulbs in parallel, such as shown in FIGS. 1 and 2, could also be added to the schematic circuits of FIGS. 14 and 15. Additional diodes and a filter capacitor could also be added if desired, and all could be contained within the end caps, giving the embodiments of FIGS. 14 and 15 the same capabilities as the charger apparatus of FIGS. 1 and 2.

A novel and improved battery charger has thus been provided in accordance with the objects of the invention. Although but a few embodiments of the present invention have been illustrated and described, it will be apparent to those skilled in the art that various changes and modifications may be made therein without departing from the spirit of the invention or from the scope of the appended claims.

What is claimed is:

1. A charging current for recharging batteries comprising:
   current source means for providing a direct current input voltage;
   contact means including at least a pair of contacts for connecting across the source or sources of direct current;
   first and second contact members for connection across the terminals of a flashlight circuit; and
   electric circuit means for interconnecting the contact means and the first and second contact members, including,
   a first filament type electric bulb and a second filament type electric bulb in parallel with each other for limiting the current in the charging circuit, for providing the function of fuses to protect the charging circuit, and for providing visual indication of the operativeness of the charging circuit and of the charging mode,
   a diode in series with the first and second filament type electric bulbs,
   a switch in series with one of the filament type electric bulbs for completing or interrupting the parallel connection of the first and second filament type electric bulbs depending on the position of the switch,
   a filter capacitor connected in series with the switch across the pair of contacts, and
   the diode, the first and second filament type electric bulbs and the switch being connected between one of the pair of contacts of the contact means and one of the contact members connected across the terminals of a flashlight circuit for providing a low resistance to current flow when the first and second filament type electric bulbs are connected in parallel by the closing of the switch and for providing a higher resistance to current flow when the switch is open, to provide a full charging capacity mode and a standby charging capacity mode, respectively, for the batteries.

2. The charging circuit for recharging batteries set forth in claim 1 in which said bulbs are of different current ratings for visual indication of the charging mode of the charger.

3. The circuit for recharging batteries set forth in claim 2 in which the current source means includes means for generating rectified alternating current voltage connected across the pair of contacts, and the filter capacitor raises the direct current applied to the first and second contact members toward the peak value of the rectified ac voltage when in the full charging capacity mode.

4. The circuit for recharging batteries set forth in claim 3 wherein:
   said means for generating rectified alternating current voltage comprises an isolation transformer for generating rectified low voltage current.

5. The apparatus of claim 1 in which the contact means includes:
   a first and second contact electrically connected respectively to the first and second contact members connected across the terminals of a flashlight circuit;
   a third contact connected to one of the contacts adjacent one of current limiting means and the switch remote from the filter capacitor; and
   the current source means includes a first direct current source connected to the first contact members and a second direct current source connected to the third contact member for providing respectively a full charging capacity mode and a stand-by charging capacity mode.

6. The apparatus of claim 5 in which the electric circuit means includes a second diode connected to the third contact.

7. Rechargeable flashlight apparatus, comprising, in combination:
   a flashlight housing;
   a lamp in the housing providing a source of light;
   rechargeable battery means in the housing;
   electrical circuitry means extending between the lamp and the battery means, including a switch for connecting and disconnecting the battery means and the lamp;

a wall in the flashlight housing;

an aperture extending through the wall;

switch means connected to the electrical circuitry and movable in the aperture between a first position and a second position for connecting in the first position the electrical circuitry in the flashlight and for disconnecting in the second position the electrical circuitry in the flashlight and comprising in the second position a first input terminal for a source of direct current for charging the battery means;

contact means on the flashlight housing connected to the electrical circuitry means and comprising a second input terminal for the source of direct current for charging the battery means;

current limiting and indicating means, including a pair of filament type bulbs connected in parallel with each other for providing two charging modes, and a mode selector switch for connecting and disconnecting one of the bulbs to and from the electrical circuitry to select a particular charging mode connected to the contact means and to the switch means for limiting the battery charging current when the switch means is in the second position and when a source of direct current is connected to the switch means and to the contact means, and for indicating such connection;

a filter capacitor connected in series with the mode selector switch; and a diode in series with the current limiting and indicating means for polarizing the electrical circuitry when connected to the source of direct current and when the switch means is in the second position.

8. The apparatus of claim 7 in which the switch means includes a spring for biasing the switch means in the first position.

9. The apparatus of claim 8 in which the current limiting and indicating means and the diode are connected in series between the contact means and the battery means when the switch means is in the second position.

10. Adapter cap apparatus for converting a flashlight into a rechargeable flashlight for use with a charger when the switch of the electrical circuit of the flashlight is closed, comprising, in combination:

housing means having a first end and a second end and an outer periphery;

means for connecting the housing means to the flashlight at the second end of the housing means;

means disposed on the outer periphery of the housing means for connecting the housing means to the charger and for positioning the housing means relative to the charger for charging the flashlight;

a wall at the first end of the housing means having an aperture extending therethrough;

switch means disposed in the aperture and movable in the aperture between a first position and a second position, including a first portion disposed externally of the housing and a second portion integral therewith disposed internally of the housing means; and means connected to the switch means for interrupting the electrical circuit in the flashlight and for connecting the electrical circuit of the flashlight to a source of direct current for charging the flashlight when the switch means is moved to the first position and for connecting the electrical circuit in the flashlight when the switch means is moved to the second position.

11. The apparatus of claim 10 in which the switch means includes:

a cylindrical portion disposed and movable in the aperture;

a cap portion secured to the cylindrical portion and disposed externally of the housing means; and a flange portion connected to the cylindrical portion and disposed internally of the housing and against the wall when the switch means is in the second position.

12. The apparatus of claim 11 in which the housing means includes:

an outer end remote from the wall;

a housing bore extending from the wall to the outer end;

insulator shell means disposed in the housing bore; and a first shoulder in the insulator shell means spaced apart from the wall of the housing means to provide a stop for the flange portion of the switch means to limit the movement of the switch means away from the second portion.

13. The apparatus of claim 12 in which the means connected to the switch means includes spring means disposed in the housing means for biasing the flange of the switch means against the wall of the housing means to move the switch means to the second position.

14. The apparatus of claim 13 in which the spring means comprises a compression spring, including a first portion disposed about the cylindrical portion of the switch means and against the flange portion of the switch means for biasing the switch means against the wall of the housing means.

15. The apparatus of claim 14 in which the insulator shell means includes a first bore for receiving the flange portion of the switch means, and a second bore for receiving the spring means, and the first shoulder is disposed between the first bore and the second bore.

16. The apparatus of claim 15 in which the spring means includes a second portion, and the insulator shell means further includes a second shoulder adjacent the second bore for receiving the second portion of the spring means.

17. The apparatus of claim 13 in which the means disposed on the outer periphery of the housing means comprises an annular groove for positioning the housing means and the switch means relative to the charger to move the switch means to the first position.

18. The apparatus of claim 17 in which the thickness of the wall is greater than the length of the first bore of the insulator shell means to prevent the switch means from coming out of the aperture in the wall.

19. The apparatus of claim 10 in which the means disposed on the outer periphery of the housing means comprises a groove for positioning the housing means relative to the charger to move the switch means to the first position and for holding the housing means in the charger without regard to the size of the flashlight secured to the housing means.

20. Rechargeable flashlight apparatus, comprising, in combination:

a flashlight housing rechargeable battery;

a lamp in the housing providing a source of light;

rechargeable battery means disposed in the housing;

charger means for providing a voltage source for direct current for charging the rechargeable battery means;

first electrical circuitry means extending between the lamp and the battery means;

first switch means for connecting and disconnecting the electrical circuitry means between the lamp and the battery means;

second electrical circuitry means extending between the lamp and the battery means connected to the first electrical circuitry, including
an end cap for the flashlight housing,
an end wall on the end cap,
an aperture extending through the end wall;

second switch means movable in the aperture between a first position and a second position for connecting in the first position the second electrical circuitry from the first electrical circuitry and comprising in the second position a first input terminal for a source of direct current for charging the rechargeable battery means, and
second input terminal means for a source of direct current for charging the rechargeable battery means;

means for holding the flashlight housing and the charger means together to move the second switch means to the second position;

current limiting and indicating means, including
a pair of filament type bulbs in parallel with each other for providing two charging modes,
a selector switch for connecting and disconnecting one of the bulbs to select a charging mode when the second switch means is in the second position, and
a capacitor connected between the bulbs when the selector switch connects the bulbs in one charging mode to filter the voltage from the voltage source and to disconnect the capacitor from between the bulbs when the selector switch disconnects one of the bulbs for the other charging mode.

21. The apparatus of claim 20 in which the means for holding the flashlight housing to the charger means includes an annular groove extending around the end cap and a clamp secured to the charger means to position and hold the flashlight means in the charger means.

22. The apparatus of claim 21 in which the current limiting and indicating means includes a diode for polarizing the second circuitry when the second switch means is in the second position.

23. The apparatus of claim 21 in which the second switch means includes a first portion disposed outside the end cap and a second portion disposed inside the end cap, and a third portion connected to the first and second portions and movable in the aperture.

24. The apparatus of claim 23 in which the second switch means further includes a spring for biasing the second switch means in the first position.

* * * * *